United States Patent
Krill

[11] Patent Number: 6,122,425
[45] Date of Patent: Sep. 19, 2000

[54] OPTICAL-FIBRE CABLE HAVING A FIXED-BEND SECTION

[75] Inventor: Paul Krill, Järfälla, Sweden

[73] Assignee: Icor Instruments AB, Bromma, Sweden

[21] Appl. No.: 09/029,837

[22] PCT Filed: Sep. 11, 1996

[86] PCT No.: PCT/SE96/01130

§ 371 Date: Mar. 9, 1998

§ 102(e) Date: Mar. 9, 1998

[87] PCT Pub. No.: WO97/10524

PCT Pub. Date: Mar. 20, 1997

[30] Foreign Application Priority Data

Sep. 11, 1995 [SE] Sweden .................................. 9503140

[51] Int. Cl.[7] ............................................................ G02B 6/26
[52] U.S. Cl. ................................................ 385/100; 385/32
[58] Field of Search ...................................... 385/32, 76, 77, 385/78, 100, 139, 140

[56] References Cited

U.S. PATENT DOCUMENTS 4,697,869 10/1987 So et al. .
4,983,007 1/1991 James et al. .............................. 385/32
5,259,045 11/1993 Azuma et al. ............................ 385/32

FOREIGN PATENT DOCUMENTS 2130429 1/1991 Canada .
2409455 9/1975 Germany ............................... 385/32
63-133108 6/1988 Japan ..................................... 385/32

Primary Examiner—John D. Lee
Assistant Examiner—Michelle R. Connelly-Cushwa
Attorney, Agent, or Firm—Browdy and Neimark

[57] ABSTRACT

An optical-fiber cable for the transmission of light has at least one flexible portion and an invariable curved line over at least a section (11A) of its length. The radius of curvature of this section, and the angle it subtends, are such that a predetermined portion of the intensity of an optical signal being transmitted through the cable is lost in the curved section. Preferably, the radius of curvature of this section is smaller than the smallest radius expected in the flexible portion of the cable. The curved section (11A) eliminates the influence of motion in the flexible portion of the cable on the transmitted signal, which are caused by variations in light leakage due to variations in radius in the flexible portion.

5 Claims, 1 Drawing Sheet

OPTICAL-FIBRE CABLE HAVING A FIXED-BEND SECTION

FIELD OF THE INVENTION

This invention relates to an optical-fibre cable for the transmission of light, comprising at least one flexible portion and including at least one optical fibre having a core and a surrounding cladding the refractive index of which is different from that of the core.

REVIEW OF RELATED TECHNOLOGY

Optical-fibre cables are used in many applications to transmit optical signals from one location to another. For example, EP-A-0 309 666 discloses a breath analyzer in which an optical-fibre cable is provided to transmit light from an optical measuring cell to a photoelectric detector in an instrument which converts the optical signals to electric signals.

In performing signal transmission in this manner it is important that external influences do not disturb the transmission such that the optical signals are distorted in an unforeseeable manner. Such an external influence may occur if by virtue of its flexibility the cable changes its configuration while the signals are being transmitted. For example, if the cable is unsupported between a sensor and a detector, it may be acted on by forces which cause a portion of the cable to be curved or to change its curvature while the transmission is in progress. As a consequence, the transmission characteristics and, accordingly, the magnitude of a signal being transmitted may be changed in an unforeseeable manner so that the measurement will show false values.

When light is transmitted in an optical fibre, most of the light is reflected at the interface between the fibre core and the surrounding cladding, because the refractive index of the cladding is different from (lower than) that of the core. Most of the light strikes the interface at an angle of incidence (as measured from the normal to the interface at the striking point) which is sufficiently large to result in total reflection at the interface.

However, a portion of the light will strike the interface at an angle of incidence which is close to the critical angle for total reflection. If as a result of motion of the cable a reduced radius of curvature should be imposed on the optical fibre at some location along the length thereof, the angle of incidence of such light at that location may become smaller than the critical angle so that the light is radiated out of the optical fibre, resulting in a weakening of the signal that reaches the detector.

Accordingly, random changes of the configuration of the optical-fibre cable occurring while the optical signals are being transmitted may result in the intensity or magnitude of a given signal fed into the fibre being affected in a more or less random manner before it reaches the detector.

OBJECTS AND SUMMARY OF THE INVENTION

The present invention aims at solving this problem and providing a method and means for substantially eliminating influences of the above-described kind in an optical-fibre cable.

This aim is realized according to the invention by arranging the cable such that it extends along an invariable curved line over at least a portion of its length, the curved section and the angle the curved section subtends being such that a certain proportion of the intensity of a signal transmitted through the cable is lost from the curved section. Advantageously, the radius of curvature is smaller than the smallest radius of curvature that the cable exhibits or may be expected to exhibit in normal use. In most cases it is preferable for the curved section to subtend an angle or change of direction of the cable of at least 90°.

Accordingly, inventive solution of the above-described problem comprises providing in the flexible optical-fibre cable a fixed or invariable curved section in which all of the light which is likely to be affected by changes of curvature is caused to be radiated out of the optical fibre. Thus, what will be left is only light which will always travel the full length of the fibre, regardless of any changes of the curvature which occur while the light is being transmitted through the cable.

The curved section may extend over a smaller or larger length of the cable. Preferably, however, the radius of curvature and the length of the curved section should be chosen such that at least 3 and preferably 10 percent of the intensity of a signal fed into the cable will be radiated out of the curved section. For example, the curved section may comprise a 180° or a full 360° turn.

The curved section may be provided by clamping or otherwise fixing the optical-fibre cable, which may inherently be flexible, in such a manner over a suitable portion of its length that it forms a bend which extends over that portion and the curvature of which remains substantially unaffected by external influences and thus remains constant, regardless of any changes of curvature or configuration that the rest of the cable undergoes.

The radius of curvature need not be the same throughout the length of the bend. In other words, the bend need not necessarily be curved along a circle. Although the radius of curvature is not directly critical, it should be sufficiently small to ensure that no part of the flexible portion in normal use of the cable will become curved to a smaller radius of curvature. The radius of curvature and the extent of the bend should be chosen in each particular case having regard to the flexibility of the optical cable and other relevant factors.

BRIEF DESCRIPTION OF THE DRAWING FIGURES

In the accompanying drawing FIG. 1 is a schematic illustration of a flexible optical-fibre cab including a section, greatly enlarged relative to the rest of the cable, having a constant or invariable curvature in accordance with the invention. FIG. 2 is a diagram showing the effect of the curved section on light fed into the cable.

DETAILED DESCRIPTION OF THE PREFERRED EMBODIMENTS

Figure 1:
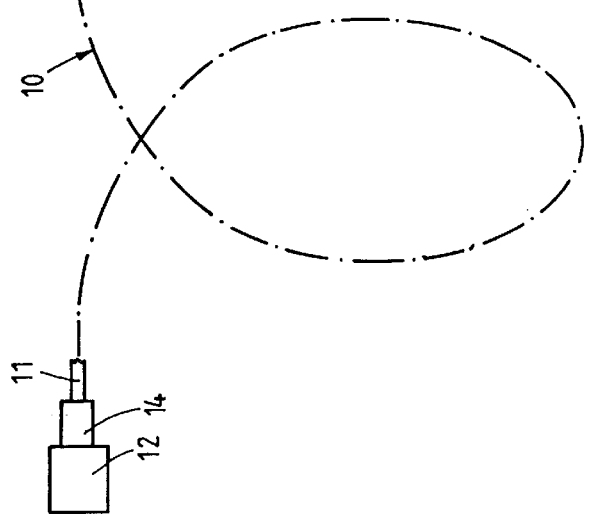

The optical-fibre cable 10 shown in FIG. 1 comprises a light guide in the shape of a monofilament optical fibre 11 and is provided at its ends with connectors 14 and 13, respectively. Connector 12 connects the cable to a light source 12 feeding uncollimated, diffuse light into the optical fibre 11, while the other connector 13 connects the cable to a receiver 15 for the light transmitted by the optical fibre 11.

The portion of the cable 10 which is closest to the connector 16—that portion may comprise the major portion of the cable if desired—is flexible so that in use of the cable (while light is being transmitted) it may become randomly deformed in different ways. For example, the cable or a shorter or longer portion of it may hang or extend loosely between a sensor and a detector so that it can swing or flex in an uncontrolled manner.

One section 11A of the cable, however, is arranged such that it is curved and rigidified with an invariable curvature. This section 11A, which is delimited in FIG. 1 by two orthogonal lines K and accordingly exhibits an angular extent or change of direction of 90°, is shown in a greatly enlarged scale together with adjoining straight fibre sections 11B. It may, but need not necessarily, be mounted in a protective enclosure of some kind as is indicated by a dash-dot line at 16.

Within the heavily enlarged cable portion in FIG. 1, two full zig-zag arrowed lines $L_1$ represent light which strikes the interface G between the core and the cladding of the optical fibre at an angle of incidence that is always larger than the critical angle $\alpha_G$ for total reflection at the interface. In other words, these lines represent light which always undergoes total reflection at the interface G, regardless of the fact that the fibre includes a sharp bend and the transmission of which through the cable is not affected by the bends of the fibre.

A broken arrowed line $L_2$ represents light which, although it undergoes total reflection before it enters the constantly curved section at 11A, strikes the interface G at an angle of incidence which is close enough to the critical angle $\alpha_G$ for the light to have in the curved section an angle of incidence which is smaller than $\alpha_G$, SO that in that section the light is not totally reflected but partly or wholly radiated out of the fibre.

Preferably, the curved section at 11A is the cable section having the smallest radius of curvature of the optical-fibre cable so that it will, so to speak, filter out substantially all light which did not previously strike the core-cladding interface at an angle smaller than the critical angle $\alpha_G$ for total reflection. Generally, the curved section should have a sufficient extent, suitably at least 90°, for a given radius of curvature to ensure that at least 3 and preferably 10 percent of the intensity of a signal being transmitted through the cable is lost in the curved section. If the curved section subtends a greater angle while the radius of curvature is the same, a correspondingly larger portion of the signal will be lost, because a larger portion of that light which is, so to speak, in the dangerous zone will then be filtered out. With a large extent (angle) of the curved section, an unduly heavy loss of light may be avoided by increasing the radius of curvature.

Figure 2:
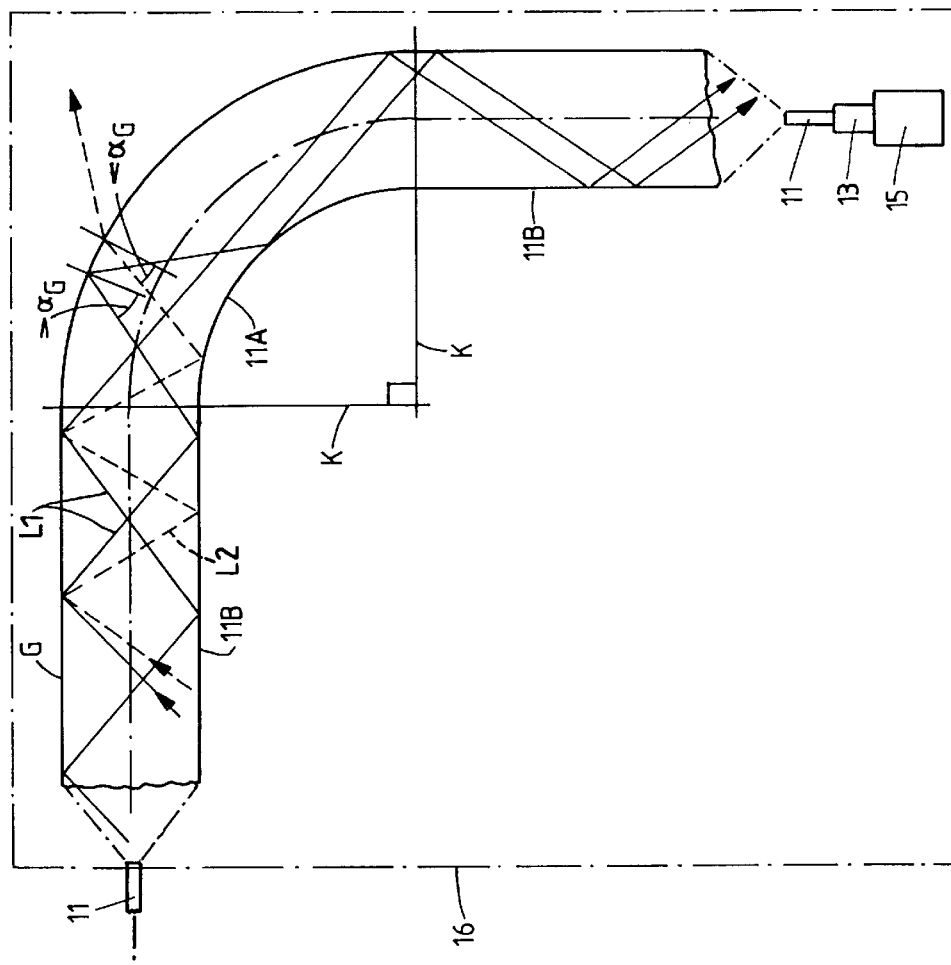
Figure 2:
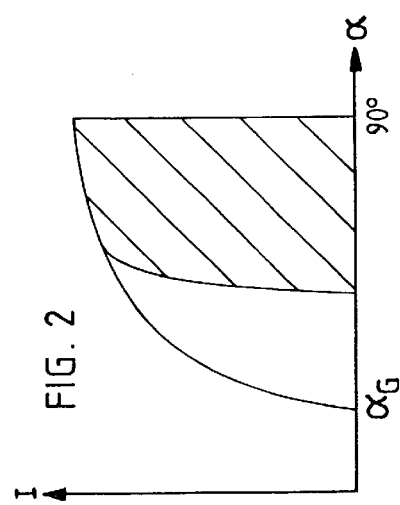

FIG. 2 illustrates the above-described filtering action. The hatched surface below the curve of the diagram represents the light, the useful signal, which travels all the way through to the receiver 15 while the blank surface to the left below the curve represents light that is lost from the optical fibre.

What is claimed is:

1. In a device comprising an optical-fiber cable to transmit light between connectors, the connectors including a first connector coupled to a first end of the cable and a second connector coupled to a second end of the cable;

the cable including an optical fiber comprising a transparent core and a cladding surrounding the core, wherein the core has a core index of refraction and the cladding has a cladding index of refraction different from the core index of refraction;

the improvement comprising:

the cable being deployed between the connectors in a first portion and a second portion;

the first portion being free to flex, whereby the first portion is deformed by relative motion of the connectors;

the first portion including everywhere and under all of the deformations a first radius of curvature greater than a light-leakage radius;

the second portion being restrained from flexing, whereby the second portion is not deformed by the relative motion of the connectors;

the second portion including a radius of curvature equal to the light-leakage radius;

whereby a predetermined portion of light transmitted along the cable is lost in the second portion and variations in curvature of the first portion have a negligible effect on light loss between the connectors.

2. An optical-fibre cable according to claim 1, wherein the radius of curvature of said second portion and the angle it subtends are such that at least 3 percent of the intensity of a signal of diffuse light being transmitted through the cable is lost in the curved section.

3. An optical-fibre cable according to claim 1, wherein the second portion (11A) subtends a change of direction of the optical fibre of at least about 90°.

4. An optical-fibre cable according to claim 1, wherein the radius of curvature is smaller than the smallest radius of curvature that the flexible portion of the cable exhibits or is expected to exhibit in use thereof.

5. An optical-fibre cable according to claim 1, wherein the second portion extending along an invariable curved line is formed by fixing an inherently flexible section of the cable along said line.

* * * * *